United States Patent [19]

Lewis et al.

[11] Patent Number: 4,507,659
[45] Date of Patent: Mar. 26, 1985

[54] PULSE COMPRESSION SIDELOBE SUPPRESSOR

[75] Inventors: Bernard L. Lewis, Ft. Washington; Frank F. Kretschmer, Jr., Laurel, both of Md.

[73] Assignee: The United States of America as represented by the Secretary of the Navy, Washington, D.C.

[21] Appl. No.: 506,945

[22] Filed: Jun. 22, 1983

[51] Int. Cl.³ .............................................. G01S 7/30
[52] U.S. Cl. .......................... 343/17.2 PC; 343/5 DP
[58] Field of Search ...................... 343/17.2 PC, 5 DP

[56] References Cited

U.S. PATENT DOCUMENTS

| 3,105,967 | 10/1963 | Cook et al. | 343/17.2 PC |
|---|---|---|---|
| 3,945,011 | 3/1976 | Glasgow | 343/17.2 PC |
| 4,095,225 | 6/1978 | Erikmats | 343/17.2 PC |
| 4,156,876 | 5/1979 | Debuisser | 343/5 DP X |
| 4,161,732 | 7/1979 | Longuemare, Jr. | 343/17.2 PC |
| 4,333,080 | 6/1982 | Collins et al. | 343/17.2 PC |

OTHER PUBLICATIONS

M. I. Skolnik, Introduction to Radar Systems, 1980, 2nd edition, pp. 388-392 and pp. 420-434.

*Primary Examiner*—T. H. Tubbesing
*Assistant Examiner*—John B. Sotomayor
*Attorney, Agent, or Firm*—Robert F. Beers; William T. Ellis; Charles E. Krueger

[57] ABSTRACT

A method and apparatus for reducing the peak to peak-sidelobe ratio of the compressed pulse output signal of a symmetrical frequency derived phase coded pulse expander-compressor. The apparatus includes a bandwidth limiting device connected to the output of a symmetrical frequency derived phase coded pulse expander-compressor.

1 Claim, 4 Drawing Figures

PULSE COMPRESSION SIDELOBE SUPPRESSOR

BACKGROUND OF THE INVENTION

This invention relates generally to pulse compression systems, and more particularly to means for reducing the range sidelobes of the compressed pulse produced in such sysems.

Pulse-compression techniques are used in radar systems in order to increase the energy of each radar pulse radiated without losing time resolution and without encountering electrical breakdown in the radiating system caused by high peak power. The radar transmits a long coded pulse with maximum allowable peak power and a bandwidth equal to the reciprocal of the desired time resolution. The received echo is processed through a matched filter which produces a pulse of length equal to the reciprocal of the transmitted signal bandwidth which is much shorter than the time length of the transmitted pulse. Pulse compression increases signal energy and range resolution and reduces clutter.

One method of implementing pulse compression in a radar system is to transmit pulses which consist of a carrier modulated according to a certain code pattern. In the radar receiver, a matched filter is provided by means of which a correlation between the incoming radar pulse and the known pattern is carried out. As a result, there is obtained a signal with a well-defined autocorrelation peak surrounded by a number of range-time sidelobes. An example of such a known method to transmit and detect phase-coded radar pulses is described in the U.S. Pat. No. 4,156,876.

The sidelobes appearing in the filtered radar pulse are not desirable for the following reason. When the radar is detecting two different targets A and B, situated at a certain distance from each other, the echo from the target A may interfere with the echo from the target B within a certain mutual distance x between the radar targets. This distance is determined by the pulse length T transmitted by the radar and the velocity of light C as $x = CT/2$. If the distance is so short that the echo pulse from B appears during the time interval when the echo pulse from the target A appears, interference is obtained. If the target A gives rise to a strong echo while the target B gives rise to a weak echo, the autocorrelation peak in the pulse reflected from B can be completely hidden by the sidelobes in the pulse reflected from A. Thus, there is a risk that the target B can not be discovered by the receiver. Therefore, it is important that the sidelobes of the reflected pulses be minimized in order to avoid the possibility that the weak target echos will be hidden by the sidelobes from an adjacent stronger target echo.

Furthermore, the presence of the sidelobes are disadvantageous as they contribute to the noise level when detecting a target in clutter, that is, unwanted radar echos from ground, sea, rain, etc.

Old methods and apparatus produce autocorrelation function peak to peak-sidelobe ratios less than or equal to 10 times the time-bandwidth product of the signal for large time-bandwidth products unless amplitude weighting is employed. Such weighting, however, reduces the output signal-to-noise ratio and complicates the compressor. A typical example is a Frank Code compressor as discussed in Cook and Bernfeld, "Radar Signal", 1967, Academic Press. These peak to peak-sidelobe ratios are not large enough to meet the needs of radars that must range resolve targets whose magnitudes may differ by many orders of magnitude and which must obtain as high a signal-to-noise ratio as possible.

OBJECTS OF THE INVENTION

Accordingly, it is an object of the present invention to increase the peak to peak-sidelobe ratio of a compressed pulse produced in a pulse compression system.

Another object is to increase the time resolution in pulse compression systems by maximally reducing the amplitude of the range sidelobes relative to that of the autocorrelation peak without seriously reducing the output signal-to-noise ratio.

SUMMARY OF THE INVENTION

The above and other objects are achieved in the present invention which is a method and apparatus for suppressing the range-time sidelobes of a symmetrical frequency derived phase coded pulse compressor. The apparatus includes a low-pass filter for filtering high-frequency components from the compressed pulse output signal of the pulse compressor. A predicted increase of 13 dB in the peak to peak-sidelobe ratio has been achieved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

The present invention is a method and apparatus for reducing the sidelobes of a compressed pulse. In order to better understand the invention, a brief description of principles of pulse compression is presented with reference to FIG. 1. The invention is then described with reference to FIGS. 2–4.

Figure 1:
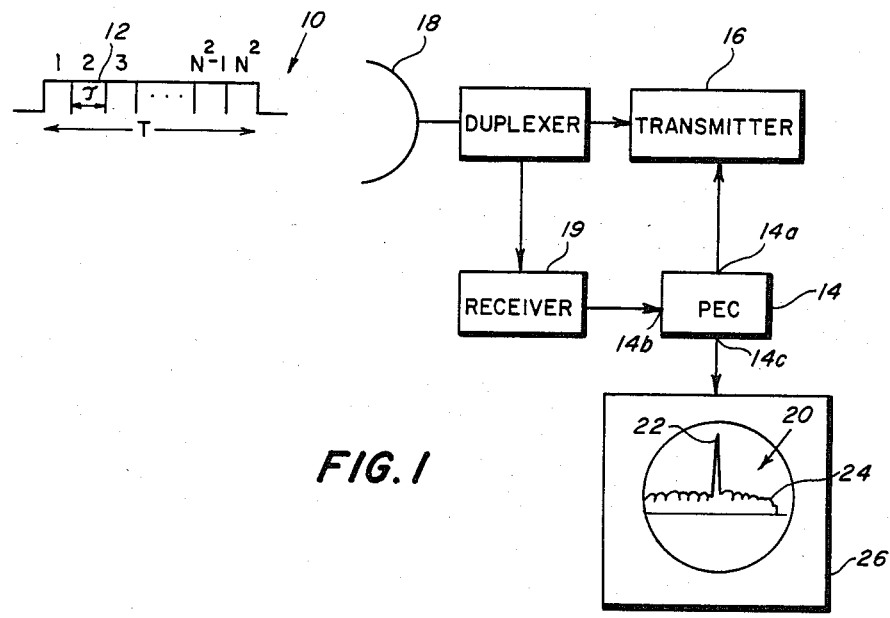
FIG. 1 is a schematic diagram of a radar system utilizing pulse compression.

Referring now to the drawings, wherein like reference numerals designate identical or corresponding parts throughout the several views, and more particularly to FIG. 1 thereof, a schematic diagram of a frequency derived phase coded pulse compression system is presented. An expanded pulse 10 of length T is divided into $N^2$ phase units 12 of length $\tau$ where $N^2\tau = T$ and N is the number of resolvable frequencies used in deriving the phase code. Each phase unit is phase weighted in accordance with a particular phase code. The phase weights of the code are generally set forth as the matrix elements, $\phi_{ij}$, of an $N \times N$ matrix. The phase (in radians) of each of the phase elements is determined by reading the elements of the $N \times N$ matrix from left to right progressing from the top of the bottom row. The expanded phase coded pulse 10 is generated by a pulse expander-compressor 14 as a signal from a first output 14a and is routed to a transmitter 16 and transmitted thru a radar antenna 18.

The echos of the expanded pulse are received thru the antenna 18 and routes thru a receiver 19 to a first input 14b of the pulse-expander compressor 14 and compressed into a compressed pulse output signal transmitted from a second output 14c of the pulse expander-compressor 14.

The compressed pulse is of length 2T having a maxima 22 of width of $2\tau$ and several sidelobes 24. The peak to peak-sidelobe ratio is the ratio of the amplitude of the maxima 20 to the amplitude of the largest sidelobe 24. As described above, the sensitivity of the radar system is increased if this peak to peak-sidelobe ratio is increased. The compressed output pulse may be viewed on a radar display device 26 such an A-scope connected to the second output 14c of the pulse expander-compressor 14.

Figure 2:
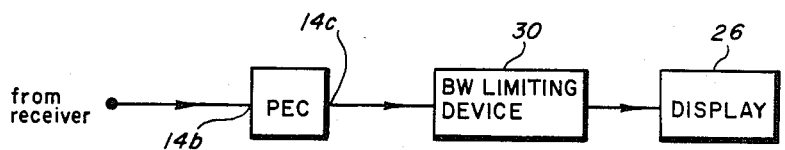
FIG. 2 is a block diagram of the invention.

FIG. 2 is a block diagram of the present invention. Referring now to FIG. 2, a bandwidth limiting device 30 is positioned between the second output of the pulse expander-compressor 14 and the display device 26 depicted in FIG. 1. Surprisingly, this bandwidth reduction significantly increases the peak to peak-sidelobe ratio for certain frequency derived phase coded pulse compressors.

The codes that were tested by computer simulation were limited to what have been called frequency derived polyphase codes i.e., the Frank, P1, P2, P3, and P4 codes. These codes are the phase weights or their conjugates taken in succession that would be used in a digital filter to separate the resolvable frequency components of analog frequency modulation waveforms sampled at a rate equal to the bandwidth over which the frequency is varied (herein called the Nyquist rate). In this case, resolvable frequencies are separated by integer multiples of the reciprocal of the duration of the signal being processed in the digital filter.

For a pulse compression ratio $\rho = N^2$, where N is the number of resolvable frequencies, the Frank code is defined by $$\phi_{i,j} = (2\pi/N)(i-1)(j-1) \qquad (1)$$

where $i = 1, 2, 3, \ldots N$ and $j = 1, 2, 3, \ldots N$. The index i designates the ith steering weight of the jth frequency filter. In forming the code, i ranges from 1 to N for each value of j. For example, with $\rho = 16$ and $N = 4$, the Frank code would consist of 16 code elements $\phi_{1,1}, \phi_{2,1}, \phi_{3,1}, \phi_{4,1}, \phi_{1,2}, \phi_{2,2}, \ldots, \phi_{4,4}$ where $\phi_{2,2} = (2\pi/N)(2-1)(2-1) = \pi/2$. Note that the Frank code would be obtained by inphase "I" and quadrature "Q" detecting a step-approximation-to-a-linear-frequency-modulation-waveform (SALFMW) with a coherent local oscillator of frequency equal to the first frequency step of the SALFMW and sampling at the Nyquist rate starting at the leading edge of the waveform.

The P1 code is similar to the Frank code in being derived from a SALFMW. However, the local oscillator used in the I, Q detectors in deriving the P1 code would have a frequency equal to the average frequency of the SALFMW. Because of this difference, the Frank code can be thought of as the result of single sideband detection while the P1 code would be the result of a double sideband detection. The phase of the ith element of the jth frequency of the P1 code is defined by:

$$\phi_{i,j} = -(\pi/N)[N+(2j-1)][(j-1)N+(i-1)] \qquad (2)$$

It should be noted that, for N odd, the DC term is in the middle of the P1 code instead of at the beginning as in the Frank code. The P1 code has frequency symmetry about its center while the Frank code is unsymmetrical.

The P2 code differs from both the Frank and P1 codes by being derived from a Butler matrix such as used in phased array antennas. It is palindromic in that it has conjugate symmetry across each frequency or beam and even symmetry about the center of the code. The ith code element of the jth beam or frequency of the P2 code is defined by $$\phi_{i,j} = \{(\pi/2)(N-1)/N - (\pi/N)(i-1)\}\{N+1-2j\} \qquad (3)$$

The P3 code is derived from an I, Q detected and sampled linear-frequency-modulation-waveform (LFMW) where the local oscillator frequency is the lowest frequency of LFMW. The ith code element is defined by $$\phi_i = (i-1)^2/N^2 = \pi(i-1)^2/\rho \qquad (4)$$

The P4 code is obtained by moving the local oscillator to the center frequency of the LFMW and sampling at the Nyquist rate starting at the leading edge of the LFMW. The P4 code is defined by code element phases of $$\phi_i = \{\pi(i-1)^2/\rho\} - \pi(i-1). \qquad (5)$$

The P4 code differs from the P3 code by having the largest code element to code element phase changes on the ends of the code instead of the middle as in P3 code. In this way, the P4 code differs from the P3 code in the same way as the P1 code differs from the Frank code.

Note that the P1 code can be made completely symmetrical (palindromic) by subtracting $\phi_{N,j}$ from each code element in the lower sideband frequencies when N is odd. This makes the autocorrelation function real rather than complex. Similarly, the P3 and P4 codes can be made palindromic by taking the first sample of the LFMW $\frac{1}{2}$ period of a code element after the leading edge of the waveform while still sampling at the Nyquist rate, i.e., I and Q sampling rates equal to the waveform bandwidth.

It was found that for the symmetrical P1, P2, and P4 code postcompression bandwidth limiting increased the peak to peak-sidelobe ratios. However, for the Frank Code and P3 code this ratio was decreased.

Figure 3:
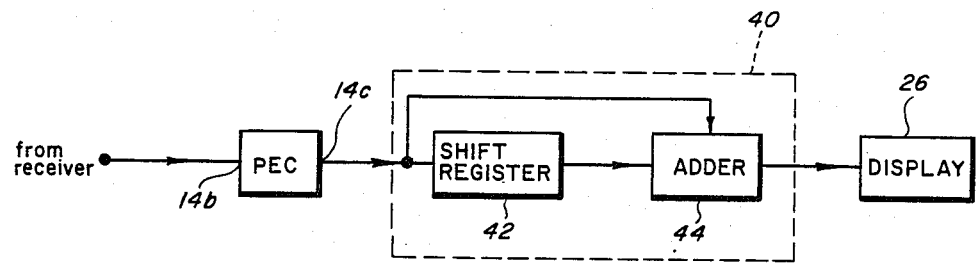
FIG. 3 is a schematic diagram of an embodiment of the invention.

The actual embodiment of the bandwidth limiting device utilized in the above-described computer simulations is depicted in FIG. 3. Referring to FIG. 3, a digital compressed output signal from a digital pulse expander-compressor 14 is inputted to a two-sample sliding window adder 40 including a shift register 42 interconnected with a digital adder 44. The sliding window adder functions as a digital low-pass filter with a bandwidth reduction ratio of 2 to 1 i.e., the frequencies in the upper half of the bandwidth are filtered out. It was found that the 2 to 1 bandwidth reduction optimized the increase of the peak to peak-sidelobe ratio. For the above-described symmetrical P1, P2, and P4 codes an increase of 13 dB in the peak to peak-sidelobe ratio was achieved with $N = 20$.

Figure 4:
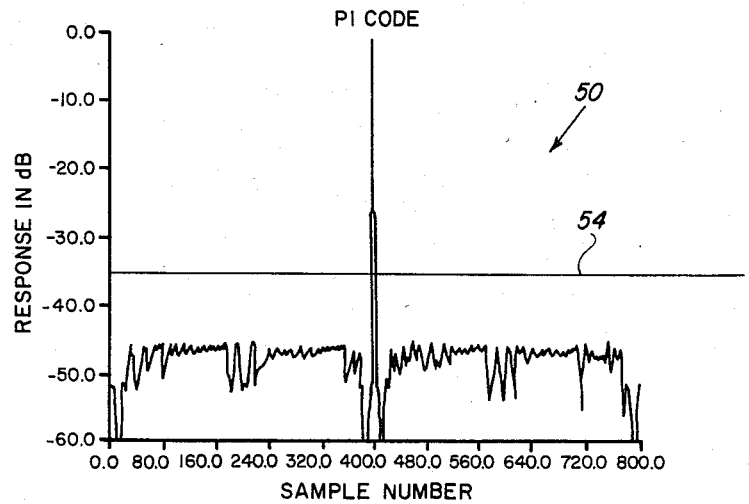
FIG. 4 includes two graphs of compressed pulses.
Figure 4:
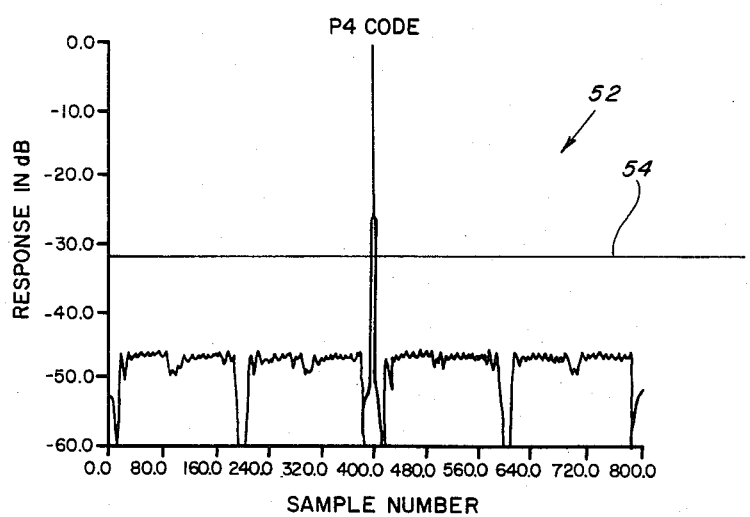

FIG. 4 includes two graphs of compressed pulses that illustrate the effects of the invention. Referring to FIG. 4, a first graph 50 depicts a P1 code compressed pulse after bandwidth reduction of 2 to 1. The horizontal line 54 indicates the normal sidelobe level without bandwidth reduction. A second graph 56 similarly illustrates the effect of the invention or a P4 code compressed pulse.

It is understood that other forms of bandwidth limiting devices capable of a bandwidth reduction of 2 to 1 may be substituted for the two-sample sliding window adder described above. For example, for an analog pulse expander-compressor this bandwidth reduction could be achieved by a low pass LC or RC filter. Additionally the bandwidth reduction ratio need not be exactly 2 to 1 to achieve an increase in peak to peak-sidelobe ratio. However, for ratios other than 2 to 1 maximum performance will not be realized.

Thus, the present invention is an efficient system for suppressing the amplitude of the range-time sidelobes of a pulse compression radar without significantly decreasing the signal to noise ratio.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A pulse compression radar system comprising:

a symmetrical frequency derived phase coded pulse expander-compressor for providing an expanded pulse for compressing the target echos of said expanded pulse received by said radar system into a compressed pulse output signal; said pulse expander-compressor utilizing a phase code selected from the group consisting of the symmetrical P1, P2, and P4 codes; and a sliding-window two sample adder, interconnected with said pulse expander compressor for receiving said compressed pulse output signal and for reducing the amplitude of the range-time sidelobes of said compressed pulse output signal.

* * * * *